(12) United States Patent
Mulcahey et al.

(10) Patent No.: US 12,428,283 B2
(45) Date of Patent: Sep. 30, 2025

(54) BEVERAGE DISPENSER WITH DISPENSING AREA CAMERAS

(71) Applicant: THE COCA-COLA COMPANY, Atlanta, GA (US)

(72) Inventors: David James Mulcahey, Roswell, GA (US); Michael Lawrence Connor, Atlanta, GA (US); Jason Franz Hejna, Atlanta, GA (US)

(73) Assignee: THE COCA-COLA COMPANY, Atlanta, GA (US)

( * ) Notice: Subject to any disclaimer, the term of this patent is extended or adjusted under 35 U.S.C. 154(b) by 265 days.

(21) Appl. No.: 18/006,905

(22) PCT Filed: Jul. 27, 2021

(86) PCT No.: PCT/US2021/070994
§ 371 (c)(1),
(2) Date: Jan. 26, 2023

(87) PCT Pub. No.: WO2022/027022
PCT Pub. Date: Feb. 3, 2022

(65) Prior Publication Data
US 2023/0271820 A1  Aug. 31, 2023

Related U.S. Application Data

(60) Provisional application No. 63/057,923, filed on Jul. 29, 2020.

(51) Int. Cl.
B67D 1/07 (2006.01)
B67D 1/08 (2006.01)

(52) U.S. Cl.
CPC ............. *B67D 1/07* (2013.01); *B67D 1/0888* (2013.01)

(58) Field of Classification Search
CPC ................... B67D 1/07; B67D 1/0888; B67D 2210/00065; B67D 2210/00099;
(Continued)

(56) References Cited

U.S. PATENT DOCUMENTS 9,696,897 B2 * 7/2017 Garcia ..................... G06T 7/62
10,219,656 B2 * 3/2019 Pelfrey ................ A47K 5/1217
(Continued)

FOREIGN PATENT DOCUMENTS

CN  108025899 A  5/2018
JP  H09 267845 A  10/1997
(Continued)

OTHER PUBLICATIONS

Partial Supplementary European Search Report, EP 21850695.4, dated Jul. 9, 2024 (16 pp.).
(Continued)

*Primary Examiner* — Donnell A Long
(74) *Attorney, Agent, or Firm* — Eversheds Sutherland (US) LLP

(57) ABSTRACT

The present application provides a beverage dispenser for dispensing a beverage into a cup. The beverage dispenser may include a dispensing area with a nozzle and an optical recognition system. The optical recognition system may include a camera positioned about the dispensing area.

13 Claims, 6 Drawing Sheets

(58) Field of Classification Search
CPC .... B67D 1/1236; B67D 1/124; B67D 1/1247; G06Q 30/06; G07F 13/065
See application file for complete search history.

(56) References Cited

U.S. PATENT DOCUMENTS

| | | | |
|---|---|---|---|
| 2009/0205747 A1* | 8/2009 | Lillard, Jr. | G07F 13/025 |
| | | | 141/94 |
| 2011/0120316 A1* | 5/2011 | Castellani | A47J 31/52 |
| | | | 99/280 |
| 2011/0260828 A1 | 10/2011 | Zhang et al. | |
| 2013/0282164 A1 | 10/2013 | Veloo | |
| 2014/0196811 A1 | 7/2014 | Ramos, III et al. | |
| 2015/0342391 A1 | 12/2015 | Seo | |
| 2017/0167783 A1 | 6/2017 | Jeong et al. | |
| 2019/0062137 A1 | 2/2019 | Schick et al. | |
| 2019/0300357 A1 | 10/2019 | Crawford et al. | |
| 2019/0392273 A1* | 12/2019 | Shigeta | G06Q 30/0185 |
| 2020/0122994 A1 | 4/2020 | Cimatti et al. | |
| 2021/0087045 A1* | 3/2021 | Carignan | B65B 61/025 |

FOREIGN PATENT DOCUMENTS

| | | | |
|---|---|---|---|
| JP | 2019 131207 A | 8/2019 | |
| WO | 2016/057956 A1 | 4/2016 | |
| WO | 2017/007229 A1 | 1/2017 | |
| WO | 2019/046174 A1 | 3/2019 | |
| WO | WO-2019158563 A1 * | 8/2019 | ............... B67D 1/06 |

OTHER PUBLICATIONS

International Search Report and Written Opinion, PCT/US2021/070994, dated Nov. 16, 2021 (8 pp.).
Supplemental European Search Report, EP 21850695.4, dated Sep. 24, 2024 (17 pp.).
Extended European Search Report, EP 25169563.1, dated Jun. 23, 2025 (10 pp.).

* cited by examiner

BEVERAGE DISPENSER WITH DISPENSING AREA CAMERAS

TECHNICAL FIELD

The present application and the resultant patent relate generally to a beverage dispenser and more particularly relate to a beverage dispenser with one or more cameras to monitor the dispensing area, including identifying the presence of a consumer's cup, reading dispensing parameters thereon, and determining overall dispensing area cleanliness.

BACKGROUND OF THE INVENTION

Recent improvements in beverage dispensing technology have focused on the use of micro-ingredients. With micro-ingredients, the traditional beverage bases are separated into their constituent parts at high dilution or reconstitution ratios. For example, the "COCA-COLA FREESTYLE®" refrigerated beverage dispensing units offered by The Coca-Cola Company of Atlanta, Georgia provide a significant increase in the number and types of beverages that may be offered by a beverage dispenser of a conventional size or footprint. Generally described, the "COCA-COLA FREESTYLE®" refrigerated beverage dispensing units create a beverage by combining a number of highly concentrated micro-ingredients with a macro-ingredient such as a sweetener and a diluent such as still or carbonated water. The micro-ingredients generally are stored in cartons positioned within or adjacent to the beverage dispenser itself. The number and type of beverages offered by the beverage dispenser thus may be limited only by the number and type of micro-ingredient cartons positioned therein.

The "COCA-COLA FREESTYLE®" refrigerated beverage dispensing units and other types of beverage dispensers may be operated directly by the consumer. As a result, a crew member may not notice for several dispenses when a spray or splash occurs that results in product residue being visible on the walls of the dispensing area or adjacent areas. Such product residue may result in an unclean or an unsanitary appearance.

Likewise, product dispensing parameters may be printed on the consumer's cup or placed on an RFID tag and the like on the cup. These dispensing parameters may inform the beverage dispenser on who has access thereto, which products are authorized, volume information, and the like. This printing or tag, however, may obscure other indicia such as marketing indicia or other types of information and/or graphics on the cup.

SUMMARY OF THE INVENTION

The present application and the resultant patent thus provide a beverage dispenser for dispensing a beverage into a cup. The beverage dispenser may include a dispensing area with a nozzle and an optical recognition system. The optical recognition system may include a camera positioned about the dispensing area.

The present application and the resultant patent further provide a method of operating a beverage dispenser. The method may include the steps of providing a cup with a code thereon indicating dispensing parameters, receiving the cup within a dispensing area of the beverage dispenser, reading the code with a camera positioned about the dispensing area, determining the dispensing parameters, and dispensing a beverage into the cup according to the dispensing parameters.

These and other features and improvements of the present application and the resultant patent will become apparent to one of ordinary skill in the art upon review of the following detailed description when taken in conjunction with the shown drawings and the appended claims.

DETAILED DESCRIPTION

Figure 1:
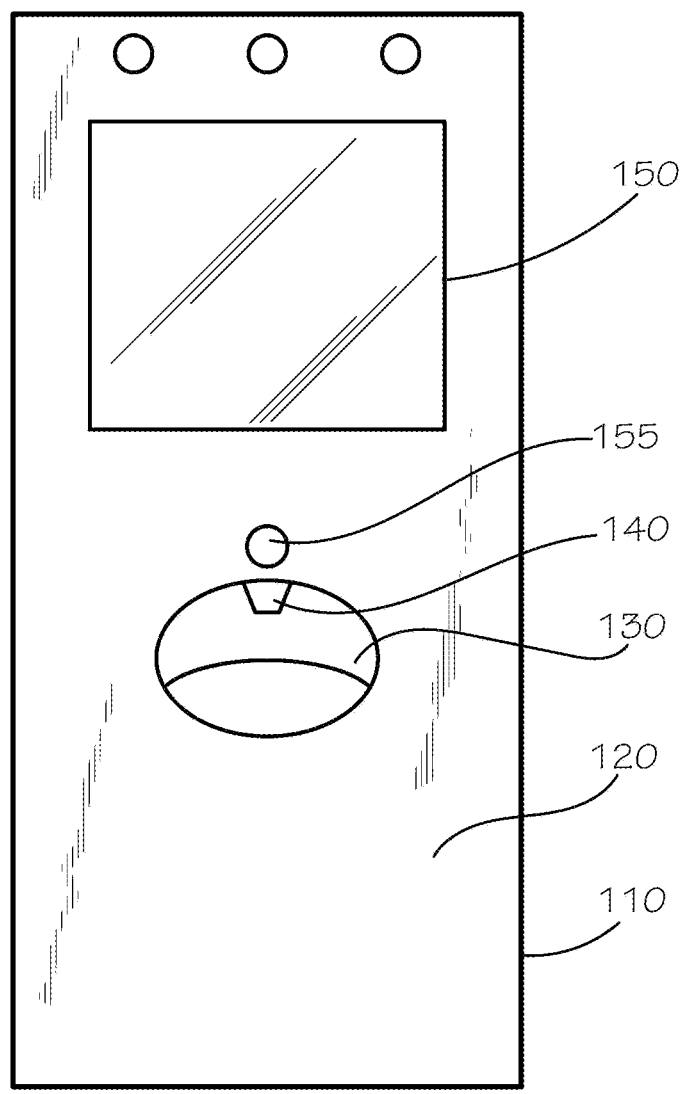
FIG. 1 is a perspective view of an example of a beverage dispenser as may be described herein.
Figure 2:
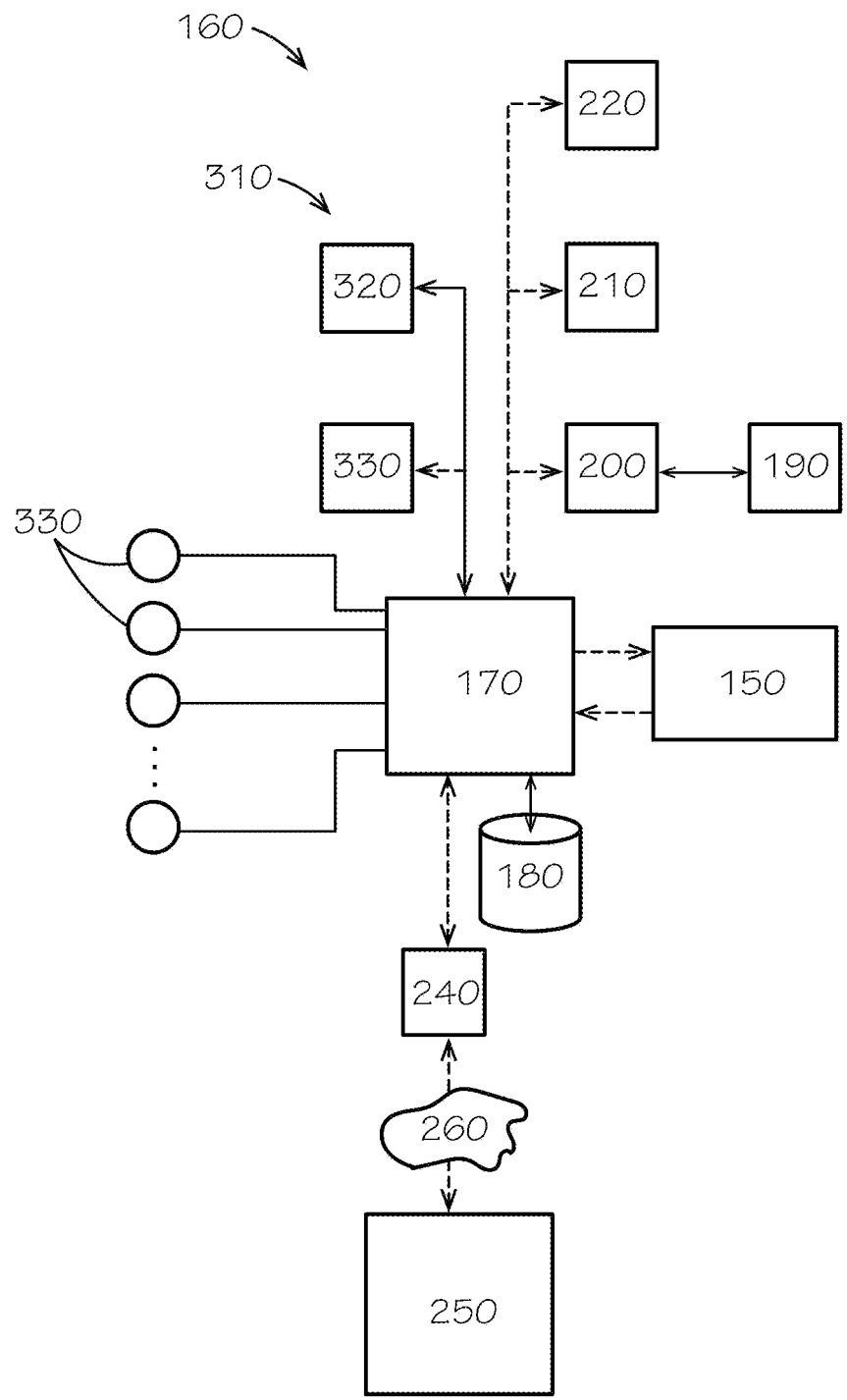
FIG. 2 is a schematic diagram of the control architecture and network connectivity of the beverage dispenser of FIG. 1.

Referring now to the drawings, in which like numerals refer to like elements throughout the several views, FIG. 1 and FIG. 2 show an example of a beverage dispenser 100 as may be described herein. The beverage dispenser 100 may dispense many different types of beverages, other types of fluids, and/or other types of products. As described above, an example of the beverage dispenser 100 is the "COCA-COLA FREESTYLE®" refrigerated beverage dispensing unit offered by The Coca-Cola Company of Atlanta, Georgia. Generally described, the "COCA-COLA FREESTYLE®" refrigerated beverage dispensing unit creates a beverage by combining a number of highly concentrated micro-ingredients with a macro-ingredient such as a sweetener and a diluent. The micro-ingredients generally are stored in cartridges positioned within the beverage dispenser itself. The number and type of beverages offered by the beverage dispenser 100 thus may be limited only by the number and type of micro-ingredient cartridges positioned therein. Alternatively, convention bag-in-box based beverage dispensers and the like also may be used herein.

The beverage dispenser 100 may include an outer shell 110 with an access door 120 thereon. The micro-ingredient cartridges and other types of beverage ingredients and the like may be loaded through the access door. The outer shell 110 may define a dispensing area 130 with one or more dispensing nozzles 140. The beverage dispenser 100, and the components thereof, may have any suitable size, shape, or configuration.

The beverage dispenser 100 may include a graphical user interface 150 positioned thereon. The graphical user interface 150 may include a video screen and the like so as to allow a consumer to select any number of different beverage or product brands, types, and/or formulations. The graphical user interface 150 may present the consumer with a series of dynamically generated menus and/or static menus. Selecting a menu item may cause the beverage dispenser 100 to formulate and dispense the beverage. The graphical user interface 150 also may display any type of graphics, messaging, video, and the like. Sound also may be incorporated herein. One or more separate display screens, banner screens, and the like also may be used. Different types of mechanical and/or electro-mechanical push buttons, such as a pour button 155, also may be used. Other components and other configurations also may be used herein.

FIG. 2 shows an example of the control architecture 160 of the beverage dispenser 100. The control architecture 160 may include a controller or a processor 170 coupled to a database 180 or other type of memory. The processor 170 may be any type of programmable logic device. The processor 170 may be local or remote. Multiple processors 170 may be used herein. The processor 170 may execute computer-executable program instructions stored in the database 180. The computer executable program instructions may include any number of module application programs required to operate the beverage dispenser 100. Specifically, the database 180 may include at least one of code instructions, information structures, or the like. Such instructions and information structures may embody or constitute machine-learning techniques (e.g., pattern recognition algorithms; inference algorithms; triangulation or location estimation algorithms; temporal algorithms; and the like) that may be utilized to implement the functionality described herein. The database 180 also may store information such as beverage recipes, ingredient volumes used, ingredient volumes remaining, transactional information, and the like.

The processor 170 also may be in communication with the graphical user interface 150 so as to receive consumer orders and/or otherwise communicate with the consumer. Any number of application modules and controls may be used herein. For example, the processor 170 may be in communication with a number of pumps and valves 190 via a pump control module 200 so as to dispense a beverage selected on the graphical user interface 150 based on a recipe stored in the database 180. Video, audio, and other content may be driven to the graphical user interface 150 via a video driver 210 and an audio driver 220. The overall lighting may be operated via a lighting module 230. Many other types of controls and functionality may be used herein.

The processor 170 also may be in communication with a network interface 240. The network interface 240 may be in communication with one or more remote servers 250 or other types of computational/storage devices over a network 260. Any or all of the functionality of the beverage dispenser 100 may be provided remotely. The network 260 may include any one or a combination of multiple different types of networks, such as cable networks, the Internet, wireless networks, and other types of private or public networks. In this manner, the beverage dispenser 100 may access, receive from, transmit to, or otherwise interact with the servers 250 or elsewhere. The beverage dispenser 100 may be in communication with other beverage dispensers, other computers or servers, original equipment manufacturers, third party vendors, and the like over the network 260. The beverage dispenser 100 may be in communication with any number of devices over the network 260.

The beverage dispenser 100 may include an optical recognition system 310. The optical recognition system 310 may be able to observe and identify objects, printing, and overall conditions within, for example, the dispensing area 130 or elsewhere. The optical recognition system 310 may include an artificial intelligence recognition module 320 in communication with the processor 170 and one or more cameras 330 or other types of sensors positioned about the dispensing area 130 or about other locations. Example of known artificial intelligence recognition modules may be provided by IBM, Google, Amazon, Microsoft, and others. The cameras 330 may be in the visual light spectrum, the ultraviolet spectrum, the infrared spectrum, or any convenient wavelength. Different types of cameras 330 may be used together. Other components and other configurations may be used here.

Generally described, the optical recognition system 310 may determine the nature of the objects, printing, or conditions within the dispensing area 130 or elsewhere based upon data obtained from the cameras 330. The data may be processed via recognition algorithms in the artificial intelligence recognition module 320 and compared to known dispensing area characteristics developed in the database 180 via machine learning techniques. Specifically, the artificial intelligence module 320 may be an object detection classifier. The artificial intelligence module 320 may be trained to recognize cups 340, the consumer's hand 345, the nozzle 140, cleaning brushes, and the like. The artificial intelligence recognition module 320 also may process running detection of the dispensing area 130 in an "interference mode. The artificial intelligence recognition module 320 and/or the database 180 may be local or remote. Other components and other configurations may be used herein.

Figure 3:
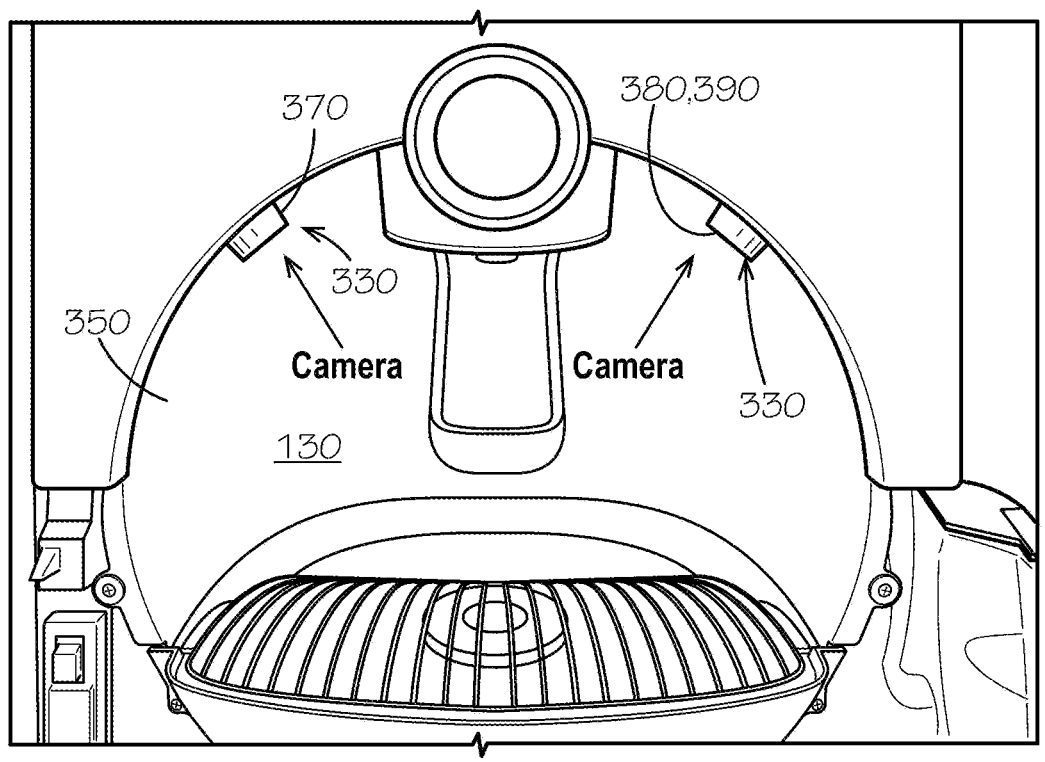
FIG. 3 is a front plan view of the beverage dispenser of FIG. 1 with the cameras of an optical recognition system.
Figure 4:
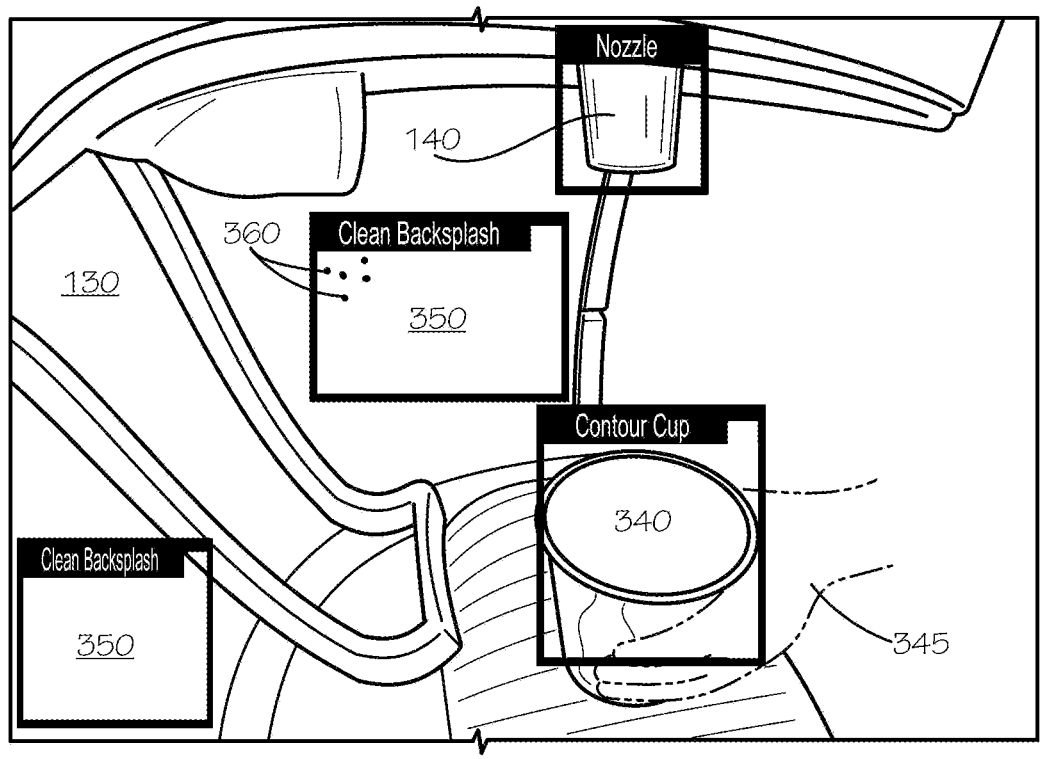
FIG. 4 is a perspective view of the dispensing area of the beverage dispenser of FIG. 1 as seen through a camera of the optical recognition system.

FIGS. 3 and 4 show the positioning of a pair of the cameras 330 about the dispensing area 130. Specifically, one of the cameras 330 may be positioned on either side of the nozzle 140. Other positions may be used herein. In this example, at least one of the cameras 330 may be a visible spectrum camera 370. The artificial intelligence recognition module 320 may detect the cup 340 about the nozzle 140 and determine where the cup 340 may be in space. As is shown in FIG. 4, the artificial intelligence recognition module 320 may detect the cup 340 via the cup's position from the top corner of the image along with the cup's width and height. Once the cup's position is known, the beverage dispenser 100 may automatically pour the beverage. The artificial intelligence recognition module 320 also may be able to distinguish between water cups, i.e., plain cups with no indicia or graphics thereon intended for water only, and outlet cups, i.e., cups with outlet indicia or graphics intended for soft drinks and the like. The artificial intelligence recognition module 320 may inform the beverage dispenser 100 to only pour water upon the detection of a water cup. Other components and other configurations may be used herein.

The artificial intelligence recognition module 320 also may be trained to monitor a backsplash 350 of the dispensing area 130 or elsewhere for spray residue 360 or other indications that the backsplash 350 is not clean and/or that an unidentified object or condition is present. Upon receiving an indication that the backsplash 350 is not clean, the artificial intelligence recognition module 320 may send a notification to a crew member to inspect the dispensing area 130 or other areas of the beverage dispenser 100. Any form of notification may be used herein.

The examples given above highlight the ability of the artificial intelligence recognition module 320 of the optical recognition system 310. Other examples include:

Sense quality of the fluid flow stream (direction, splatter, cohesiveness, twist, drips).

Sense fluid flow stream color (monitor injection of micro-ingredients).

Sense drips of micro-ingredients.

Sense presence of nozzle tip and removal of nozzle tip.
  a. Can be used to prevent dispensing without nozzle tip.
  b. Can be used as a monitor for cleaning (see if crew member removes and re-installs).

Sense presence of ice in cup.

Sense presence of ice on the cup rest.

Sense fill level of cup—ice and/or fluid.

Sense backup of fluid in drip tray (drain clogging).

Sense overflow of drip tray (spill on floor/counter/dumped ice).

Sense ice delivery/problems with ice delivery (lever activation with no ice).

Determine demographic information about the user from the hand image.

Sense the presence of a cleaning brush being used.

Differentiate types of cups: Branded, marked, water only, customer supplied, etc., and enable or restrict service.

Identify authorized crew members.

Figure 5:
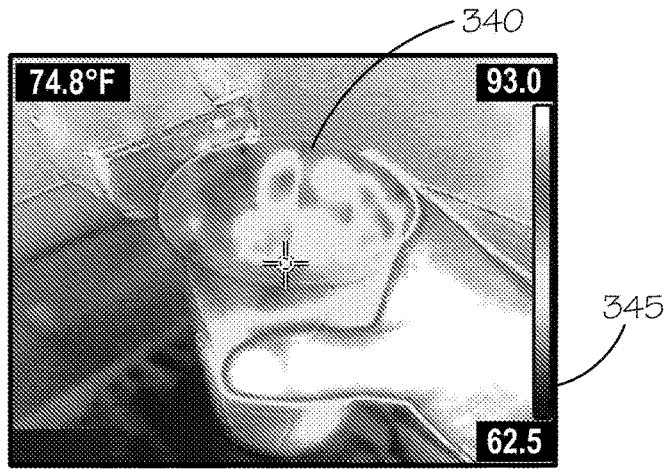
FIG. 5 is a perspective view of the dispensing area of the beverage dispenser of FIG. 1 as seen through a camera of the optical recognition system.
Figure 6:
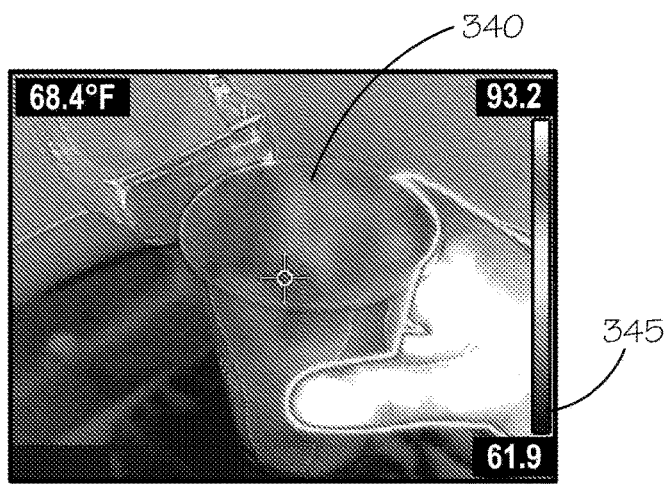
FIG. 6 is a perspective view of the dispensing area of the beverage dispenser of FIG. 1 as seen through a camera of the optical recognition system.

In addition to the visible light spectrum camera 330 described above, the camera 330 also may be an infrared camera 380 and/or an ultraviolet camera 390. FIGS. 5 and 6 show the use of the infrared camera 380. As is shown, the infrared camera 380 can distinguish between the cup 340 and the consumer's hand 345 based on the respective heat signatures. The infrared camera 380 also may determine beverage characteristics such as beverage temperature and the like.

Figure 7A:
FIG. 7A shows a code in invisible ink under visible light.
Figure 7B:
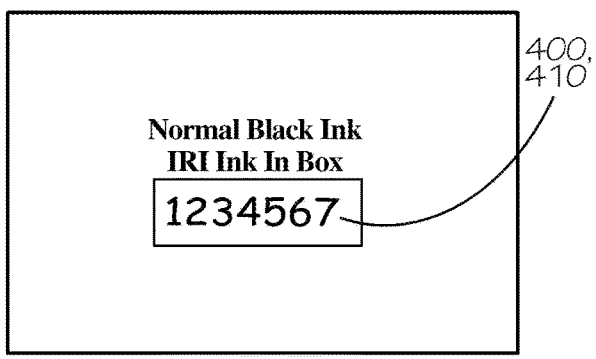
FIG. 7B shows the code of FIG. 7A under infrared light.
Figure 8:
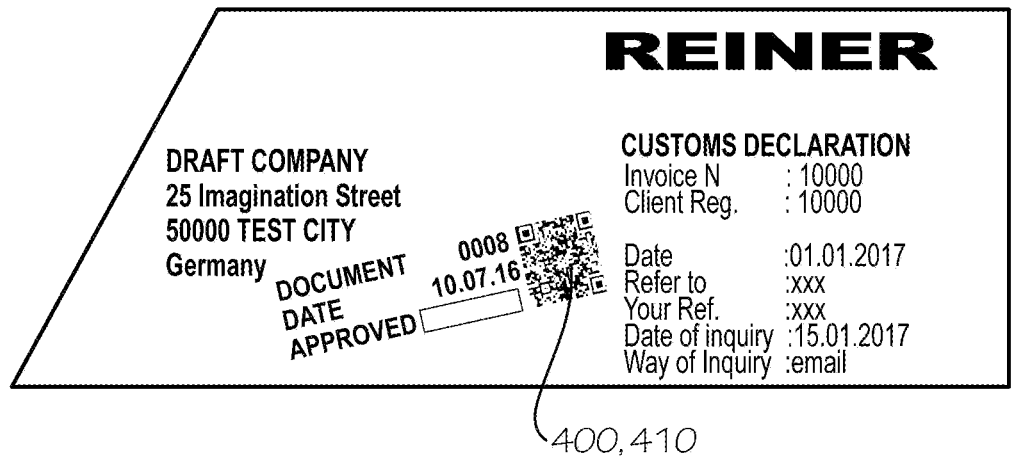
FIG. 8 shows a code under ultraviolet light.

Both the infrared camera 380 and the ultraviolet camera 390 may have the ability to read "invisible" ink 400. By the term "invisible", we mean that the ink is not visible in the visible light spectrum. The "invisible" ink, however, is visible under infrared light and/or ultraviolet light. Specifically, the applied ink is visible to the camera 330 or other type of sensor that is sensitive to the appropriate electromagnetic wavelengths. The ink can produce a positive or a negative image, i.e., the ink can reflect or absorb the associated electromagnetic spectra. The ink also can fluoresce under the appropriate wavelength to be visible to the camera 330. FIGS. 7A and 7B show the use of invisible ink 400 in the visible spectrum and in the infrared spectrum. FIG. 8 shows the use of the invisible ink 400 in the ultraviolet spectrum.

Figures 9, 10:
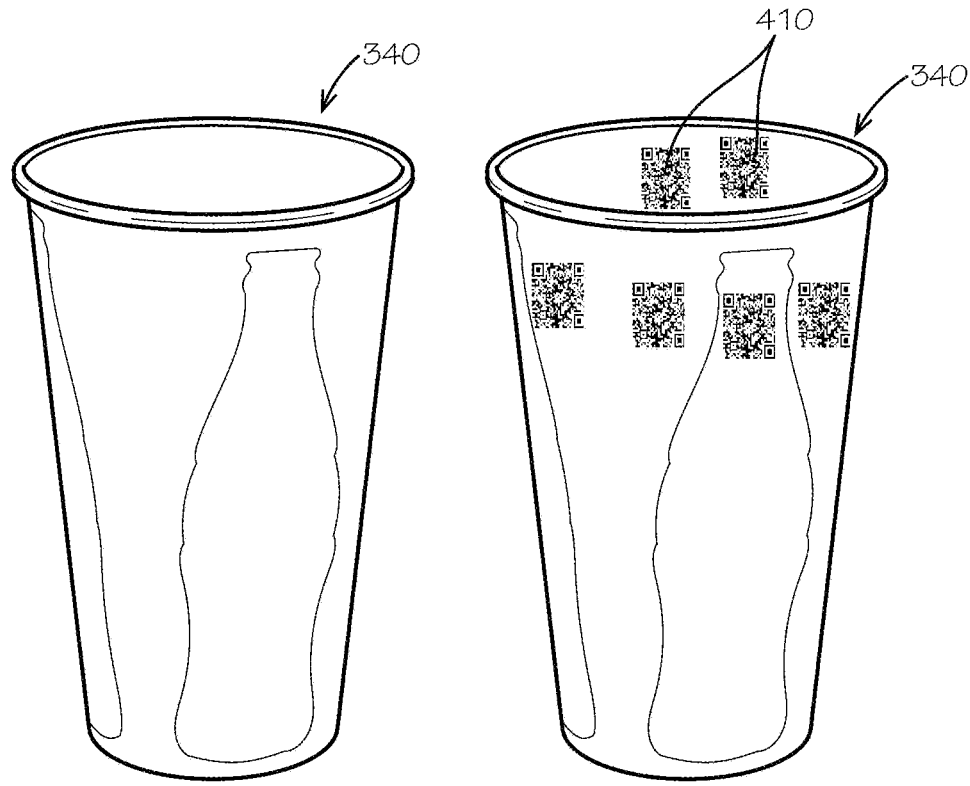
FIG. 9 is a perspective view of a cup.
FIG. 10 is a perspective view of a cup with codes or dispensing indicia thereon.

The use of the invisible ink 400 thus allows different types of dispensing codes 410 representing dispensing parameters or to be printed or otherwise applied to the consumer's cup 340. In FIG. 9, the code 410 is not visible under visible light. In FIG. 10, the code 410 is visible under either infrared or ultraviolet light. The use of the invisible ink 400 thus allows the code 410 to be printed on the cup 340 without obscuring the existing graphics of other types of printed material already on the cup 340. Likewise, the use of the invisible ink 400 reduces the opportunity for third parties to attempt to alter the code 410.

The codes 410 may be read by the cameras 330 and inform the beverage dispenser 100 as to the specific dispensing parameters associated with the cup 340. For example, free refills may be prevented. Various types of dispense limitations or parameters may be applied. The codes 410 may include, for example, time, available volume verses poured volume, available time verses start time and finish time, available calories versus poured calories, and other parameters. To the extent that available volume, time, calories, refills are not completed or expired, the consumer may be allowed further dispensing. The paid for total volume, however, may not be exceeded. Other limitations may include the prevention of an authorized consumer sharing an authorized cup 340 with an unauthorized consumer, prevention of reusing an authorized cup 340 on a different day, and use by unauthorized consumers. Other types of business parameters may be applied herein. In addition to reading the codes 410, the cameras 330 or other types of sensors also may be used to gather product information such as product temperature, ambient temperature, carbonation level, and the like. The optical recognition system 310 thus provides accurate dispensing control across a large number of access parameters.

Figure 11:
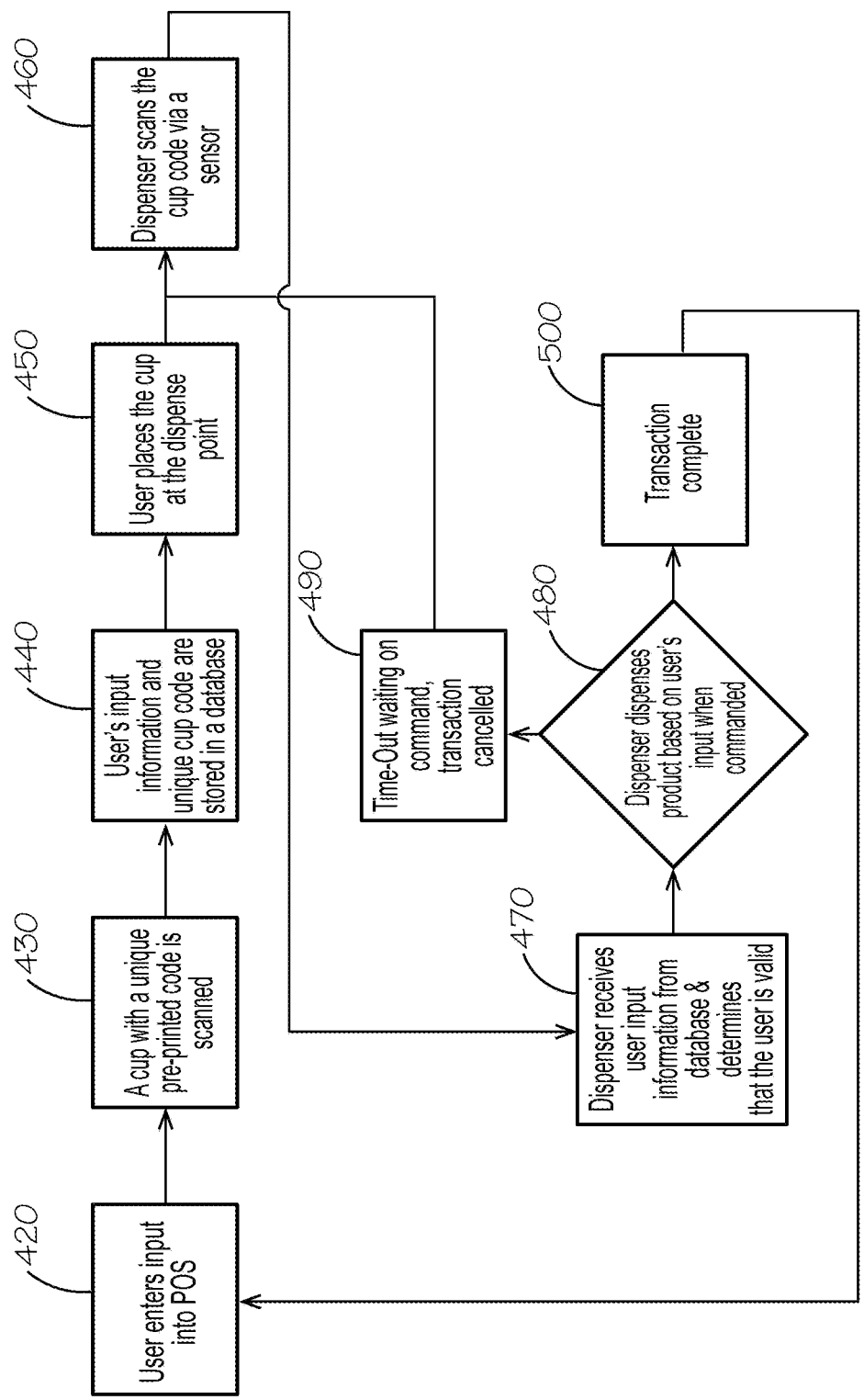
FIG. 11 is a flow chart showing exemplary method steps in the operation of the beverage dispenser of FIG. 1.

FIG. 11 shows a flow chart of exemplary steps in the use of the optical recognition system 310 with the beverage dispenser 100. At step 420, a consumer or other user enters input at a point of sale location. As described above, the input may include a beverage selection, volume, additives, refills, time period, and any other type of dispensing parameters. The point of sale location may be a remote location such as restaurant order station, a convenience store checkout location, or any type of data input location. Alternatively, the graphical user interface 150 of the beverage dispenser 100 also may be used. At step 430, a cup 340 with a unique pre-printed code 410 may be scanned at the point of sale location and provided to the consumer. Alternatively, the code 410 could be printed onto the cup 340 at the point of sale location or elsewhere. At step 440, the consumer's input information and the unique code are stored in the database 180 of the beverage dispenser 100.

At step 450, the consumer places the cup 340 in the dispensing area 130 of the beverage dispenser 100. At step 460, the optical recognition system 310 reads or otherwise scans the code 410 via the cameras 330 or other sensors. At step 470, the processor 170 receives the user input from the database 180, determines if the user is authorized, and determines the dispensing parameters. At step 480, the beverage dispenser 100 dispenses the beverage based on the dispensing parameters when commanded. At step 490, the transaction will be cancelled if a time out limit is reached. If the beverage is dispensed, the transaction is complete at step 500. The method steps described herein are exemplary only. Many other and different method steps may be used herein in any order.

The beverage dispenser 100 with the optical recognition system 310 thus allows accurate control of dispensing parameters without having to rely on RFID tags and the like. Rather, the cameras 330 of the optical recognition system 310 can read the codes 410 indicating the dispensing parameters in the light of any spectrum. By using "invisible" ink for the codes 410, the codes do not interfere with other types of indicia thereon. Moreover, the artificial intelligence module 320 can teach the optical recognition system 310 to recognize product residue and the like within the dispensing area 130 so as to maintain the dispensing area 130 and other locations in a clean and spotless appearance.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof

We claim:

1. A beverage dispenser for dispensing a beverage into a cup, comprising:

a dispensing area;

a nozzle in the dispensing area;

an optical recognition system;

the optical recognition system comprising a camera positioned about the dispensing area;

wherein the camera comprises an infrared camera and/or an ultraviolet camera; and wherein the cup comprises a code in invisible ink and wherein the infrared camera and/or the ultraviolet camera reads the code.

2. The beverage dispenser of claim 1, wherein the camera detects the cup within the dispensing area.

3. The beverage dispenser of claim 1, wherein the dispensing area comprises residue of the beverage therein and wherein the camera detects the residue.

4. The beverage dispenser of claim 1, wherein the camera comprises a visible spectrum camera.

5. The beverage dispenser of claim 4, wherein the cup comprises a code in visible ink thereon and wherein the camera reads the code.

6. The beverage dispenser of claim 4, wherein the code comprises dispensing parameters for operating the beverage dispenser.

7. The beverage dispenser of claim 1, where the cup comprises the code in infrared ink and wherein the infrared camera reads the code.

8. The beverage dispenser of claim 1, where the cup comprises the code in ultraviolet ink and wherein the ultraviolet camera reads the code.

9. The beverage dispenser of claim 1, wherein the optical recognition system comprises an artificial intelligence module in communication with the camera.

10. The beverage dispenser of claim 1, wherein the optical recognition system comprises a plurality of cameras.

11. The beverage dispenser of claim 10, wherein the optical recognition system comprises one or more of a visible spectrum camera, the infrared camera, and the ultraviolet camera.

12. The beverage dispenser of claim 1, further comprising a processor in communication with the optical recognition system.

13. A method of operating a beverage dispenser, comprising:

providing a cup with a code thereon in invisible ink indicating dispensing parameters;

receiving the cup within a dispensing area of the beverage dispenser;

reading the code with an infrared camera and/or an ultraviolet camera positioned about the dispensing area;

determining the dispensing parameters; and dispensing a beverage into the cup according to the dispensing parameters.

* * * * *